(12) United States Patent
Strasser et al.

(10) Patent No.: US 8,506,439 B2
(45) Date of Patent: Aug. 13, 2013

(54) AXLE DRIVE DEVICE FOR AN AXLE OF A MOTOR VEHICLE, AS WELL AS MOTOR VEHICLE

(75) Inventors: Sebastian Strasser, Ingolstadt (DE); Ralf Schwarz, Ingolstadt (DE)

(73) Assignee: Audi AG, Ingolstadt (DE)

( * ) Notice: Subject to any disclaimer, the term of this patent is extended or adjusted under 35 U.S.C. 154(b) by 16 days.

(21) Appl. No.: 12/709,616

(22) Filed: Feb. 22, 2010

(65) Prior Publication Data

US 2010/0240485 A1 Sep. 23, 2010

(30) Foreign Application Priority Data

Feb. 20, 2009 (DE) .......................... 10 2009 009 809

(51) Int. Cl.
*F16H 48/06* (2006.01)
(52) U.S. Cl.
USPC ........................................................ 475/221
(58) Field of Classification Search
USPC ................... 475/150, 221, 225; 180/65.245, 180/65.26
See application file for complete search history.

(56) References Cited

U.S. PATENT DOCUMENTS

| | | | | |
|---|---|---|---|---|
| 5,495,906 A * | 3/1996 | Furutani | ..................... | 180/65.23 |
| 6,056,660 A * | 5/2000 | Mimura | ......................... | 475/205 |
| 6,059,064 A * | 5/2000 | Nagano et al. | ................ | 180/243 |
| 6,120,407 A * | 9/2000 | Mimura | ......................... | 475/225 |
| 7,044,255 B2 * | 5/2006 | Maeda et al. | ................. | 180/242 |
| 7,080,707 B2 * | 7/2006 | Kirkwood | ...................... | 180/245 |
| 7,182,168 B2 * | 2/2007 | Kamata et al. | ................ | 180/242 |
| 7,294,086 B2 * | 11/2007 | Brissenden et al. | ........... | 475/231 |
| 7,338,404 B2 * | 3/2008 | Gassmann et al. | ............ | 475/231 |
| 8,012,057 B2 * | 9/2011 | Meixner | ........................... | 475/6 |
| 8,057,351 B2 * | 11/2011 | Joachim et al. | ............... | 475/342 |
| 2006/0266569 A1 * | 11/2006 | Fujiwara et al. | ............ | 180/65.2 |
| 2007/0221425 A1 * | 9/2007 | Meissner et al. | .............. | 180/233 |
| 2010/0170737 A1 * | 7/2010 | Meissner et al. | .............. | 180/248 |

FOREIGN PATENT DOCUMENTS

| | | |
|---|---|---|
| DE | 102004024086 A1 | 12/2005 |
| DE | 102006031089 A1 | 1/2008 |
| DE | 102006058835 A1 | 6/2008 |
| DE | 102008039928 A1 | 3/2010 |
| DE | 102008061946 A1 | 6/2010 |
| DE | 102008063596 A1 | 7/2010 |

* cited by examiner

*Primary Examiner* — Dirk Wright
(74) *Attorney, Agent, or Firm* — Novak Druce Connolly Bove + Quigg LLP

(57) ABSTRACT

The invention relates to an axle drive device for an axle of a motor vehicle, with a drive assembly and a differential. Here, it is provided that the drive assembly is in the form of an electrical drive assembly and the differential has at least one override unit. The invention furthermore relates to a motor vehicle.

14 Claims, 3 Drawing Sheets

AXLE DRIVE DEVICE FOR AN AXLE OF A MOTOR VEHICLE, AS WELL AS MOTOR VEHICLE

The invention relates to an axle drive device for an axle of a motor vehicle, with a drive assembly and a differential. The invention furthermore relates to a motor vehicle.

BACKGROUND OF THE INVENTION

Axle drive devices of the initially mentioned type are known from the prior art. In the overwhelming majority of motor vehicles, propulsion according to the current prior art takes place via a drive assembly designed as an internal combustion engine. The driving torque is transferred to the wheels of the motor vehicle by way of a transmission and a differential. For all-wheel drive vehicles the driving torque is divided between the front and rear axles by way of different types of distribution systems. For example, a mid-differential and clutch should be mentioned here. Mechanical all-wheel drive systems, starting, in particular, from vehicles of a certain size class (B segment), generally distribute a high proportion of the driving torque to the rear axle. The objective here is to relieve the front axle of the transfer of a high driving torque so that it has a relatively high lateral force potential at any time and thus can transfer the lateral force impressed by the steering system of the motor vehicle. In this way, the tendency of the motor vehicle to understeer is reduced and high vehicle agility is achieved.

The differential of the axle drive device is designed to transfer the driving torque to the wheels provided on the axle of the motor vehicle and, at the same time, to allow a differential speed of the wheels. Here, two designs of the differential can be distinguished. In an open differential, the driving torque is always immediately transferred to the wheels, as a result of which the transfer is free of yawing moments. If, conversely, a limited slip differential is used, the torque can be shifted from one of the more rapidly turning wheels to a more slowly turning wheel. The objective of development in the motor vehicle domain has recently been to increase the available torque in a motor vehicle or to increase the power integrated in it or the available torque with fuel consumption as low as possible and at the same time to achieve high agility of the motor vehicle. The results of the development, however, are often unsatisfactory with respect to fuel consumption of motor vehicles.

Therefore, the object of the invention is to make available an axle drive device for an axle of a motor vehicle with which both an increase of the available torque and also high agility of the motor vehicle can be achieved, with fuel consumption as low as possible.

SUMMARY OF THE INVENTION

This is achieved, according to the invention, by the drive assembly being designed as an electrical drive assembly and the differential having at least one override unit. Therefore, first of all, the object is to use an electrical drive assembly to drive an axle. But at the same time, high agility of the motor vehicle is to be achieved. For this reason, at least one override unit is assigned to the differential. This linking of the electrically driven axle to the differential with the override unit can yield smaller dimensioning of the required electrical drive power, with agility remaining the same. The differential with at least one override unit is also referred to as a override differential and is used to implement torque vectoring. This means that the torque can be redirected to the wheel to which the override unit is assigned. Therefore, the torque on one wheel of the axle can be influenced specifically, i.e., can be increased and also reduced. The override unit conventionally consists of one gear stage and a clutch. The drive assembly can be connected to the differential or the differential cage by way of a clutch. The drive assembly, in this case, can be decoupled from the differential or the axle. The drive assembly is decoupled, especially, from the differential if there is not enough energy for operation of the drive assembly or additional torque for driving of the motor vehicle is not needed. But, in each instance, the torque on the wheel or wheels can be influenced. This means that the torque can be rerouted to one of the wheels even if driving torque is not being produced by the drive assembly or is not being transferred to the shaft. By the combination of the electrical drive assembly and the differential with the override unit, the performance of the motor vehicle is characterized primarily by the variable torque distribution which can be achieved therewith. It is provided that to drive the axle, the axle drive device merely has an electrical drive assembly. Therefore, there is no delivery of the torque of another drive assembly to the axle drive device, for example, by way of a power divider and a cardan shaft.

One development of the invention calls for the electrical drive assembly to be used as a generator. In order to reduce fuel consumption of the motor vehicle, especially when the vehicle is slowing down, recuperation operation is to be carried out by means of the electrical drive assembly. For this purpose, the drive assembly is used as a generator. This means that the motor vehicle is braked by a torque produced in generator operation of the drive assembly, with electrical energy being produced. In this way, the consumption advantages of the axle drive device with the electrical drive assembly can be fully exploited. In particular, it is provided here that the electrical energy produced during recuperation operation be stored and subsequently used to drive the motor vehicle. Therefore, producing the required electrical drive power for the drive assembly by the internal combustion engine is not provided; this corresponds to serial operation of a hybrid drive device. But this can lead to the electrical drive assembly not being able to be used when stored electrical energy is not available. Since the axle drive device, however, has a differential with at least one override unit, regardless of the availability of energy for the electrical drive assembly, the performance of the motor vehicle can be influenced by the torque being distributed between the wheels provided on the axle of the motor vehicle by means of the differential or the override n unit. This also applies to generator operation of the drive assembly.

Another configuration of the invention calls for the override unit to be adjustable by means of a controllable and/or adjustable clutch. By triggering the clutch, torque can thus be distributed among the wheels of the axle. Here, it is provided that the clutch can be essentially continuously controlled or triggered. Activation of the clutch leads to acceleration of the respective wheel and thus to a shifting of the torque to this wheel. The clutch can be triggered or controlled especially advantageously such that the torque of one of the wheels can be adjusted between zero and the entire torque produced by the drive assembly. The special advantage is that, regardless of the driving torque, a differential torque can be set between the wheels of the axle. This means that the possible torque range on each wheel extends from $-0.5\,M_{max}$ to $+0.5\,M_{max}$ for the case in which there is no driving torque. In the case of driving, this driving torque must be added.

According to one advantageous development of the invention, it is provided that a torque from the override device is applied to the axle section by way of or by means of the clutch. In a first embodiment, the clutch is therefore intended for transferring a torque between the override means and the axle section. There is at least one of the wheels of the axle is provided on the axle section. Therefore, not only is it provided, as in a second embodiment, that by actuating the clutch, the torque is applied to the axle section, but that it is routed directly via the clutch to the axle section. If the clutch can be controlled or adjusted, the torque which has been applied to the axle section can thus be set.

One development of the invention calls for there to be an axle drive device for the front axle and/or the rear axle of the motor vehicle. Preferably the axle drive device is designed for the rear axle of the motor vehicle. Fundamentally, however, any axle can be equipped with the electrical drive assembly and the differential with the override unit. If the axle drive device for an all-wheel drive vehicle is provided on the rear axle, the agility advantages of the above described rear-emphasized design of the all-wheel drive, i.e, in particular, the relatively high lateral force potential at any time, can also be achieved with the axle drive device which is driven by the electrical drive assembly. The performance with the rear-emphasized design in this arrangement is achieved not only with the electrical drive assembly, but primarily by means of the override unit.

In one preferred development, there is at least one further axle to which its own drive assembly is assigned. This drive assembly can be, for example, an internal combustion engine, an electrical drive assembly, or a hybrid drive. In this way, several axles of the motor vehicle can be driven by means of one drive assembly at a time. For example, on the front axle of the motor vehicle, there can be an internal combustion engine, and, on the rear axle, the electrical drive assembly, as well as the differential with at least one override unit. Thus, there is a hybrid drive which couples the torques of the electrical drive assembly and of the drive assembly of the other axle by way of the ground under the motor vehicle.

According to one development of the invention, it is provided that the drive assembly can be used in order to produce a differential torque between the required setpoint torque and the torque which can be transferred and/or produced by the drive assembly of the other axle. If the setpoint torque cannot be attained by the drive assembly of the other axles, the torque difference will be equalized by the drive assembly of the axle drive device. The setpoint torque is, for example, the torque which has been selected by the driver of the vehicle. The torque of the drive assembly of the other axle can be limited, for example, by a maximally producible torque. But the case can also arise that the torque of this drive assembly cannot be transmitted to the ground under the vehicle, i.e, it is no longer available for propelling the vehicle. This can be the case, for example, when the motor vehicle is to be accelerated when cornering or is to start off when traction on the ground is poor. It is especially provided that the drive assembly is operated solely for equalization of the difference torque. Thus, the demands on continuous electrical power of the drive assembly are low, making possible smaller dimensioning. In addition, the drive assembly can be used to make available a braking torque, in particular, in order to carry out recuperation operation and, in doing so, recover the electrical energy from the braking torque.

Another configuration of the invention calls for the differential to be a bevel gear differential or a planet gear differential. But other constructions of the differential can also be used.

One development of the invention calls for at least one override unit to be assigned to a first axle section and/or a second axle section. The first and the second axle section are dynamically connected to the wheels of the motor vehicle. They can thus be driven by way of the first and second axle section. It can now be provided that the override unit is assigned only to the first or second axle section. As an alternative, it is provided that both on the first and also the second axle section, there is one override unit each. If the override units are located on one side of the differential, the arrangement is asymmetrical, while in an arrangement on both axle sections, the arrangement is symmetrical.

One preferred development calls for the drive assembly to be provided orthogonally, axially parallel, or coaxial to the axle. This means that the drive assembly or one axle of the drive assembly can be arranged differently relative to the axle drive device.

One development of the invention calls for the axle drive device to be made as an all-wheel drive device of the vehicle. Thus all wheels of the motor vehicle are dynamically connected to the axle drive device according to the above details. Conventionally, this means that the axle drive device is used both for the front axle and also for the rear axle of the motor vehicle. But it can also be the case that the motor vehicle has more than two axles. In that case, all the axles of the motor vehicle can be driven with the axle drive device according to the above details.

The invention furthermore relates to a motor vehicle with an axle drive device, in particular according to the text above, for one axle of the motor vehicle, with a drive assembly, and a differential. Here, it is provided that the drive assembly is made as an electrical drive assembly and the differential has at least one override unit.

DETAILED DESCRIPTION OF THE PREFERRED EMBODIMENTS OF THE INVENTION

Figure 1:
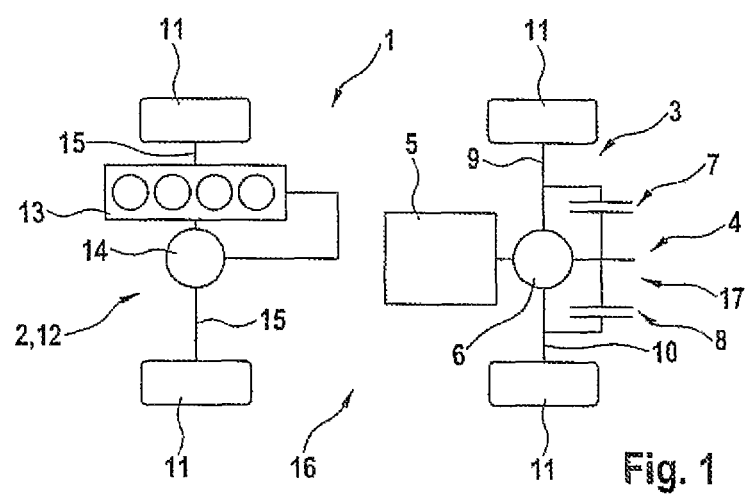
FIG. 1 shows a schematic of a motor vehicle with a front and a rear axle, the rear axle having an axle drive device with an electrical drive assembly and a differential with at least one override unit.

FIG. 1 shows a motor vehicle 1 with a front axle 2 and a rear axle 3. The rear axle 3 has an axle drive device 4 with a drive assembly 5 which is made as an electrical drive assembly, for example as an electric motor, and with a differential 6. The differential 6 has a first override unit 7 and a second override unit 8, the first override unit 7 being assigned to a first axle section 9 and the second override unit 8 being assigned to a second axle section 10. The axle sections 9 and 10 are each connected to the wheels 11 of the motor vehicle. The front axle 2 of the motor vehicle represents the other axle 12 of the axle drive device 4. The axle 12 is assigned its own drive assembly 13 which is in the form of an internal combustion engine and which is connected by way of a differential 14 to the axle sections 15 of the front axle 2, the axle sections 15 for their part being connected to wheels 11. The axle drive device 4 therefore forms an all-wheel drive device 16.

The differential 6 and the override units 7 and 8 on the rear axle 3 of the motor vehicle 1 represent the override differential 17. By linking the electrical drive assembly 5 to this override differential 17, smaller dimensioning of the required electrical drive power can be achieved. By means of the override differential 17, the torque produced by the drive assembly 5 can be transferred virtually at will to the axle sections 9 and 10 or to the wheels 11 which are connected thereto. Therefore, for example, the entire torque produced by the drive assembly 5 can be applied to the first axle section 9 or to the second axle section 10 alternately or uniformly distributed between them. The override differential 17 works here in terms of a torque vectoring system. The performance of the motor vehicle 1 can be decisively influenced in this way and is characterized primarily by the described variable torque distribution of the torque vectoring system. Actuation of the override unit 7 and 8 leads to acceleration of the respective wheel 11 and thus to a distribution of torque to it. It is expressly provided that the differential 6 is not driven by way of the power divider and a cardan shaft, but by the electrical drive assembly 5.

The override differential 17 yields the advantage that the performance of the vehicle 1 can be influenced independently of the operating state of the electrical drive assembly 5. Therefore, this likewise applies when only a small amount or no electrical energy at all is available for operating the drive assembly 5. The operation of the electrical drive assembly 5 for the motor vehicle 1 shown here is moreover only necessary when not all the setpoint torque demanded by the driver can be produced or transferred on the front axle 2. In the former case, the torque of the drive assembly 13 can be supplemented by the drive assembly 5. The second case can occur, for example, when the motor vehicle 1 is dramatically accelerated when cornering or is to be started off on ground with a low friction coefficient. In both cases it can occur that the torque produced by the drive assembly 13 cannot be transferred via the wheels 11 to the ground under the motor vehicle 1, so that the setpoint torque is not reached. In this case, the drive assembly 5 is activated so that the additionally produced torque is added to the torque of the drive assembly 13.

Figure 2:
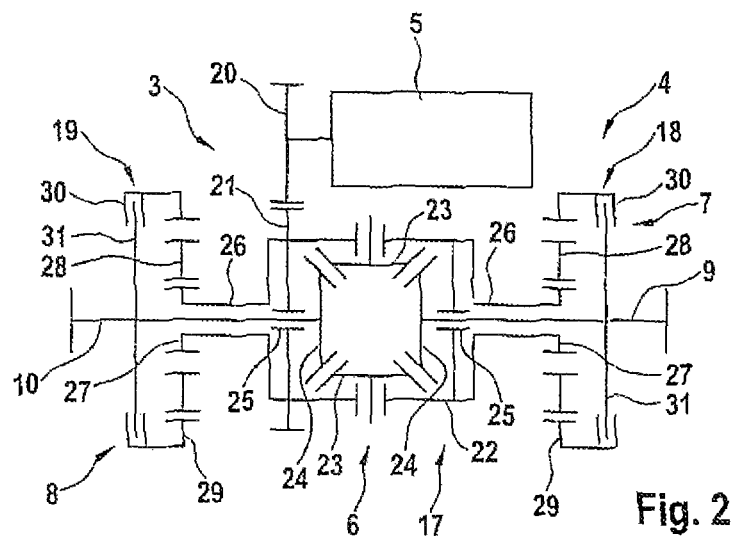
FIG. 2 shows a schematic of the axle drive device with the drive assembly and the differential with two override units in a first symmetrical embodiment.

FIG. 2 shows a first embodiment of the axle drive device 4, the rear axle 3 being shown. The drive assembly 5, the differential 6, as well as the first override unit 7, and second override unit 8 are recognizable. The differential 6 with the override units 7 and 8 forms the override differential 17. By way of the override differential 17, the torque produced by the drive assembly 5 is distributed between the first axle section 9 and the second axle section 10. To set the override units 7 and 8, there are a first clutch 18 and a second clutch 19. They can be controlled and/or adjusted independently of one another. In the embodiment shown in FIG. 2, it is provided that by way of the clutches 18 and 19, a torque is applied to the respective axle section 9 or 10 by the respective override unit 7 or 8. The drive assembly 5 is provided axially parallel to the rear axle 3.

By way of a gear 20, the drive assembly 5 drives a spur gear 21 which is nonrotatably connected to the cage 22 of the differential 6. In the differential cage 22 several balancing gears 23 are mounted. The latter are in the form of bevel gears and mesh with the bevel gears 24 located nonrotatably on the axle sections 9 and 10. The differential cage 22 has bearings 25 with which it is supported on the axle sections 9 and 10. The differential cage 22 is connected for each of the override units 7 and 8 to a hollow shaft 26, which units are coaxial to the axle sections 9 and 10. On the hollow shafts 26, there is one gear 27 at a time which meshes with one toothed ring 28 at a time. On the side facing away from the gear 27, the toothed ring 28 engages a ring gear 29 which is nonrotatably connected to the primary side 30 of the clutches 18 and 19. The secondary side 31 of the clutches 18 and 19 is nonrotatably connected to the axle sections 9 and 10. By way of opening or closing the clutches 18 and 19, therefore the torque produced by the drive assembly 5 can be shifted between the axle sections 9 and 10. When the first clutch 18 is actuated, the first axle section 9 is accelerated or a higher torque is transferred to it, while at the same time the torque on the second axle section 10 is reduced. As an alternative, it can of course be provided that there is only one of the two override units 7 and 8. In this case, the structure of the override differential 17 is asymmetrical.

Figure 3:
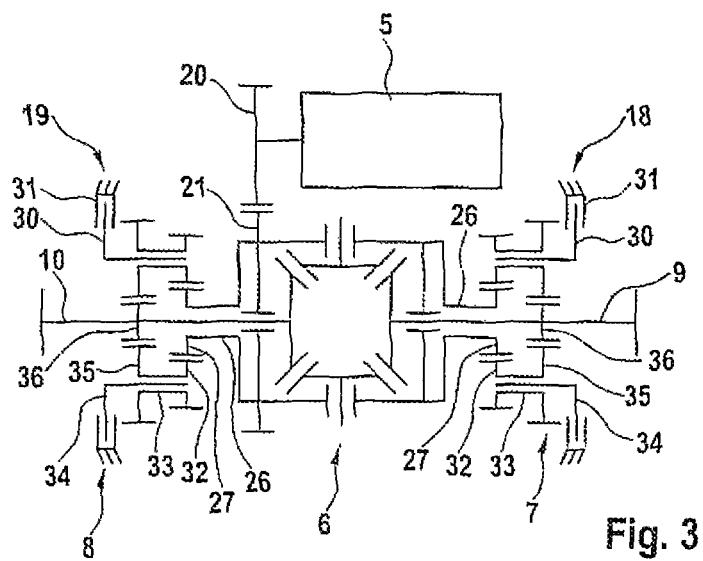
FIG. 3 shows the axle drive device in another symmetrical embodiment.

FIG. 3 shows another embodiment of the axle drive device 4. The difference from the embodiment shown in FIG. 2 is that torque cannot be transferred directly to the axle sections 9 and 10 by means of the clutches 18 and 19. The clutches 18 and 19, in this case, are used only to influence the distribution of the torque between the axle sections 9 and 10. As already explained using FIG. 2, the torque produced by the drive assembly 5 is transferred to the differential 6 which has the already described structure. The gear 27 located on the hollow shaft 26 meshes with a first gear 32 of at least one planet gear 33. The planet gear 33 is mounted to be rotatably movable in a planet carrier 34, the latter itself being rotatable coaxially with the axle section 9 or 10. There can be several planet gears 33 over the periphery of the planet carrier 34. A second gear 35 of the planet gear 33 meshes with a gear 36 which is located on the axle section 9 or 10. By way of this gear, a torque can be routed from the override unit 7 and 8 to the axle section 9 or 10. The planet carrier 34 forms the primary side 30 of the clutches 18 and 19, while the secondary side 31 is mounted stationary, that is to say, it is attached, for example, to the housing of the axle drive device 4.

As long as the clutches 18 and 19 are opened, the planet carrier 34 can turn freely. In this case, torque is not delivered via the gear 36 to the axle sections 9 and 10. When the clutch 18 or 19 is triggered, the planet carrier is 34 is slowed down. Thereupon, torque is delivered from the override unit 7 or 8 to the respective axle section 9 or 10. In this way, the distribution of the torque produced by the drive assembly 5 to the axle sections 9 or 10 can be set. Thus, a wheel 11 assigned to one of the axle sections 9 and 10 can be intentionally braked or accelerated.

It is also possible, with the drive assembly 5 disconnected, to transfer the torque from one of the axle sections 9 or 10 to the respectively other axle section 10 or 9, i.e., a wheel assigned to one axle section 9 or 10 is braked while the wheel 11 assigned to the respectively other axle section 10 or 9 is accelerated. In this way, the agility of the vehicle 1 can be increased even at an instant at which the drive assembly 5 cannot or is not to be operated.

For example, the drive assembly 5 cannot be operated when sufficient torque can be produced or transferred to the ground under the vehicle 1 by means of the drive assembly 13, i.e., the drive assembly assigned to the front axle 2 of the motor vehicle 1. The drive assembly 5 is thus operated only when the torque produced by the drive assembly 13 is too low or cannot be transferred to the base surface (for example, due to a low friction coefficient). It can be additionally provided that a clutch (not shown) be located between the drive assembly 5 and the differential 6 so that they can be decoupled from one another.

Figure 4:
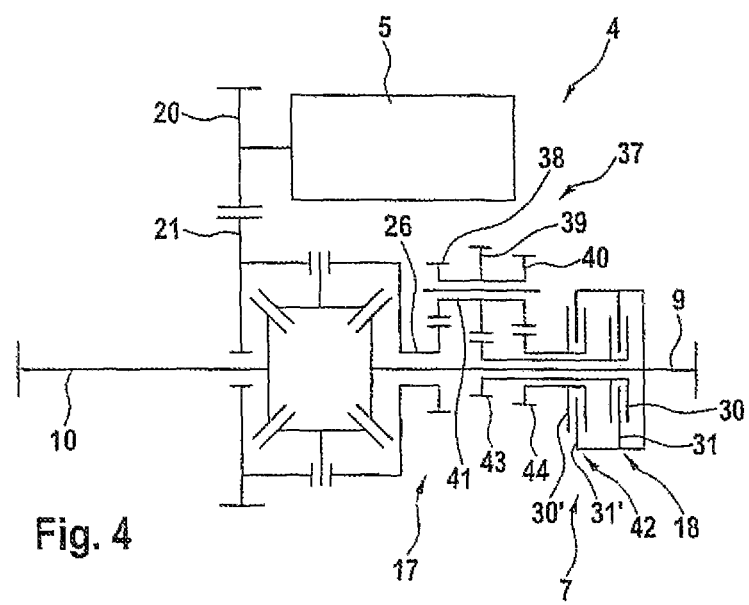
FIG. 4 shows a third, asymmetrical embodiment of the axle drive device.

FIG. 4 shows a third embodiment of the axle drive device 4. The general structure of the illustrated axle drive device 4 corresponds to the one shown in FIGS. 2 and 3. Therefore, reference is made to the corresponding statements and only the differences are described below. The override units 7 and 8 here are not arranged symmetrically around the differential 6, but are located on one side of the differential 6. The manner of action corresponds to that already described. The hollow shaft 26 connected to the differential cage 22 drives a override drive 37 by way of the gear 27. The drive, for this purpose, has a first gear 38 which meshes with the gear 27. The override drive 37 has likewise a second gear 39 and a third gear 40 which are nonrotatably mounted on a common shaft 41 together with the first gear 38. Without actuating the clutch 18 and another clutch 42, symmetrical division of the driving torque between the axle sections 8 and 9 takes place. The gear stages 27 and 38, 39 and 43, as well as 40 and 44 also run together with the hollow shaft 26 without a load.

The override units 7 and 8 in this construction have both a first clutch 18 and also another clutch 42. The primary side 30 of the first clutch 18 is dynamically connected by way of the gear 43 which meshes with the gear 39 to the former. Likewise, the primary side 30' of the second clutch 18 is dynamically connected by way of the gear 44 which meshes with the gear 40 to the former. The secondary sides 31 and 31' of the clutches 18 and 42 are connected to the first axle section 9. It is provided that the gears 39 and 43 or 40 and 44 each form a different gear ratio. On the primary sides 30 and 30' of the clutches 17 and 42, therefore the speeds are different. Depending on which of the clutches 17 and 42 is being triggered, higher or lower speeds are impressed on the axle section 9. This results in a higher or lower torque on the wheel 11. By the equalizing action of the differential 6, the increase or decrease of the rotational speed of the axle section 9 has a direct influence on the rotational speed of the axle section 10.

The invention claimed is:

1. A wheel drive system for a motor vehicle, comprising:
   a first axle assembly including a first pair of axles each connected to a wheel, a first differential drivingly connected to said axles and a first motor drivingly connected to said first differential; and
   a second axle assembly including a second pair of axles each connected to a wheel, a second differential drivingly connected to said second pair of wheels, at least one override assembly drivingly interconnecting said second differential and one of said second axles and a second motor drivingly connected to said second differential, wherein said overriding assembly includes a first linked set of gears and a clutch selectively drivingly interconnecting a cage of said second differential and said one of said second pair of axles and a second linked set of gears and a clutch selectively drivingly interconnecting said cage of said second differential and said one of said second pair of axles.

2. A system according to claim 1 wherein said first motor comprises an internal combustion engine.

3. A system according to claim 1 wherein second motor comprises an electric motor.

4. A system according to claim 1 wherein said second motor is disposed one of orthogonally, parallel and coaxially relative to said one of said second axles.

5. An assembly according to claim 1 wherein said first and second sets of gears are each provided with gears of different diameters.

6. An assembly according to claim 3 wherein said second motor is functional as a generator.

7. A system according to claim 1 wherein said gears are of different diameters.

8. A wheel drive assembly for a motor vehicle, comprising:
   a pair of axles each connected to a wheel;
   a differential drivingly connected to said wheels;
   a motor drivingly connected to said differential; and
   at least one override assembly drivingly interconnecting said differential and said axle including a first linked set of gears and a first clutch selectively drivingly interconnecting the cage of said differential and said one of said axles, and a second linked set of gears and a second clutch selectively drivingly interconnecting said cage of said differential and said one axle.

9. An assembly according to claim 8 wherein said first and second sets of gears are each provided with gears of different diameters.

10. An assembly according to claim 9 wherein a first plate of each of said clutches is rotatable with one of said gears and a second plate thereof is rotatable with said axis.

11. An assembly according to claim 8 wherein said motor comprises an electric motor.

12. An assembly according to claim 8 wherein said motor is disposed one of orthogonally, parallel and coaxially relative to said axis.

13. An assembly according to claim 11 wherein said motor is functional as a generator.

14. An assembly according to claim 8 wherein said differential is one of a bevel gear differential and a planet gear differential.

* * * * *